US008412682B2

(12) United States Patent
Zheng et al.

(10) Patent No.: US 8,412,682 B2
(45) Date of Patent: Apr. 2, 2013

(54) SYSTEM AND METHOD FOR RETRIEVING AND USING BLOCK FINGERPRINTS FOR DATA DEDUPLICATION

(75) Inventors: Ling Zheng, Sunnyvale, CA (US); Yinfung Fong, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 186 days.

(21) Appl. No.: 11/477,886

(22) Filed: Jun. 29, 2006

(65) Prior Publication Data

US 2008/0005141 A1    Jan. 3, 2008

(51) Int. Cl.
    *G06F 17/30* (2006.01)
(52) U.S. Cl. ..................................... 707/687
(58) Field of Classification Search ............ None
    See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,732,265 A | 3/1998 | Dewitt et al. | |
| 5,819,292 A | 10/1998 | Hitz et al. | |
| 5,907,672 A * | 5/1999 | Matze et al. ............. 714/8 |
| 5,990,810 A * | 11/1999 | Williams ................ 341/51 |
| 6,061,770 A | 5/2000 | Franklin | |
| 6,081,875 A | 6/2000 | Clifton et al. | |
| 6,289,451 B1 * | 9/2001 | Dice ..................... 713/168 |
| 6,341,341 B1 | 1/2002 | Grummon et al. | |
| 6,374,266 B1 * | 4/2002 | Shnelvar ................ 1/1 |
| 6,892,211 B2 * | 5/2005 | Hitz et al. ............... 707/202 |
| 7,010,553 B2 | 3/2006 | Chen et al. | |
| 7,043,485 B2 | 5/2006 | Manley et al. | |
| 7,072,910 B2 | 7/2006 | Kahn et al. | |
| 7,079,053 B2 * | 7/2006 | Kolavi ................... 341/67 |
| 7,103,602 B2 | 9/2006 | Black et al. | |
| 7,124,305 B2 * | 10/2006 | Margolus et al. ......... 713/193 |
| 7,127,577 B2 | 10/2006 | Koning et al. | |
| 7,162,662 B1 | 1/2007 | Svarcas et al. | |

(Continued)

FOREIGN PATENT DOCUMENTS

EP    1349 089    1/2003
IN    938/DEL/2007    4/2007

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Syed Hasan
(74) *Attorney, Agent, or Firm* — Cesari and McKenna, LLP

(57) ABSTRACT

A system and method for calculating and storing block fingerprints for data deduplication. A fingerprint extraction layer generates a fingerprint of a predefined size, e.g., 64 bits, for each data block stored by a storage system. Each fingerprint is stored in a fingerprint record, and the fingerprint records are, in turn, stored in a fingerprint database for access by the data deduplication module. The data deduplication module may periodically compare the fingerprints to identify duplicate fingerprints, which, in turn, indicate duplicate data blocks.

22 Claims, 13 Drawing Sheets

U.S. PATENT DOCUMENTS

| | | | |
|---|---|---|---|
| 7,289,643 B2 | 10/2007 | Brunk et al. | |
| 7,333,993 B2 | 2/2008 | Fair | |
| 7,475,098 B2 | 1/2009 | Patterson et al. | |
| 7,516,286 B1 | 4/2009 | Dalal et al. | |
| 7,567,188 B1 | 7/2009 | Anglin et al. | |
| 7,624,335 B1* | 11/2009 | Maheshwari et al. | 714/807 |
| 7,698,532 B1 | 4/2010 | Gonzalez | |
| 7,752,384 B2 | 7/2010 | Moody et al. | |
| 2002/0107877 A1* | 8/2002 | Whiting et al. | 707/204 |
| 2002/0194529 A1* | 12/2002 | Doucette et al. | 714/6 |
| 2003/0018878 A1* | 1/2003 | Dorward et al. | 711/216 |
| 2003/0182312 A1* | 9/2003 | Chen et al. | 707/200 |
| 2003/0182317 A1 | 9/2003 | Kahn et al. | |
| 2004/0030668 A1 | 2/2004 | Pawlowski et al. | |
| 2004/0083245 A1* | 4/2004 | Beeler, Jr. | 707/204 |
| 2004/0260929 A1* | 12/2004 | Albornoz et al. | 713/176 |
| 2005/0114289 A1* | 5/2005 | Fair | 707/1 |
| 2006/0020804 A1 | 1/2006 | Schleifer et al. | |
| 2007/0050423 A1 | 3/2007 | Whalen et al. | |
| 2007/0255758 A1 | 11/2007 | Zheng et al. | |
| 2008/0005201 A1 | 1/2008 | Zheng | |
| 2008/0133561 A1 | 6/2008 | Dubnicki et al. | |
| 2008/0301134 A1 | 12/2008 | Miller et al. | |

FOREIGN PATENT DOCUMENTS

| | | |
|---|---|---|
| WO | WO 02/08956 | 1/2002 |
| WO | WO 2007/127360 | 11/2007 |
| WO | WO 2008/005211 | 1/2008 |
| WO | WO 2008/005212 | 1/2008 |
| WO | WO 2008/153821 | 12/2008 |

OTHER PUBLICATIONS

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al, *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., *AFS-3 Programmer's Reference: Architectural Overview*, Transarc Corporation, Pittsburgh, PA, 1.0 edition 1991.

Patterson, D. A., et al., "*A Case for Redundant Arrays of Inexpensive Disks (RAID)*", Proceedings of the International Conference on Management Data (SIGMOD), Jun. 1988, pp. 109-116.

U.S. Appl. No. 11/105,895, entitled *Method and Apparatus for Identifying and Eliminating Duplicate Data Blocks and Sharing Data Blocks in a Storage System*, by Ling Zheng, et al., on Apr. 13, 2005, 46 pages.

Notification of Transmittal of The International Search Report and The Written Opinion of the International Searching Authority and Declaration, Date of Mailing Apr. 9, 2008, 12 pages.

"The Keyed-Hash Message Authentication Code (HMAC)", published by National Institute of Standards and Technology, Mar. 6, 2002, 20 pages.

Hong, Bo et al., "Duplicate Data Elimination in a SAN File System", no date, 14 pages.

Bilenko et al., Adaptive Duplicate Detection Using Learnable String Similarity Measures, Published in Proceedings of the Ninth ACM SIGKDD International Conference on Knowledge, Aug. 23, 2003, pp. 1-10.

Business Wire, SEPATON Announces Next Generation Data De-Duplication Software; Delivers Industry's Highest Level of De-Duplication Without Affecting Backup Performance, Business Wire, May 2006, 32 pages.

Crochemore et al., Pattern Matching and Text Compression Algorithms, dated Jan. 8, 2003, retrieved from http://citeseer.comp.nus.edu.sg/595025.html, 50 pages.

$EMC^2$, Celerra File Server Architecture for High Availability, $EMC^2$ Corporation, Aug. 1999, 12 pages.

Hernandez et al., Real-world Data is Dirty: Data Cleansing and the Merge/Purge Problem, Published in Data Mining and Knowledge Discovery, vol. 2, pp. 1-31 (48 pages).

Hitz, Dave et al., File System Design for an NFS File Server Appliance, Technical Report 3002, Rev. C3/95, presented Jan. 19, 1994, USENIX Winter 1994, 23 pages.

Lee et al.. IntelliClean: a Knowledge-based Intelligent Data Cleaner, published by ACM International Conference on Knowledge Discovery and Data Mining, pp. 290-294.

Muthitacharoen, Athicha, et al., "A Low-bandwidth Network File System," ACM SOSP. Proceedings of the ACM Symposium on Operating Systemprinciples, ACM, US, XP-002405303, Oct. 21, 2002, pp. 174-187.

Reichenberger, Delta Storage for Arbitrary Non-Text Files, published in Proceedings of the 3rd International Workshop on Software Configuration Management, Jun. 12-14, 1991, pp. 144-152.

National Institute of Standards and Technology, Federal Information Processing Standards Publication: The Keyed-Hash Message Authentication Code (HMAC), FIPS PUB 198, Information Technology Laboratory, Gaithersburg, Maryland, Mar. 2002, 20 pages.

Notification of Transmittal of the International Search Report and the Written Opinion of the International Searching Authority, or the Declaration, International Filing Date: Apr. 26, 2007, International Application No. PCT/US2007/010222, Applicant: Network Appliance, Inc., Date of Mailing: Apr. 9, 2008, pp. 1-15.

Notification of Transmittal of the International Search Report and the Written Opinion of the International Searching Authority, or the Declaration, International Filing Date: Jun. 25, 2007, International Application No. PCT/US2007/014666, Applicant: Network Appliance, Inc., Date of Mailing: Feb. 22, 2008, pp. 1-18.

"Notification of Transmittal of the International Search Report and the Written Opinion of the International Searching Authority, or the Declaration," International Filing Date: May 29, 2008, International Application No. PCT/US2008/006805, Applicant: Network Appliance, Inc., Date of Mailing: Oct. 27, 2008, pp. 1-15.

* cited by examiner

SYSTEM AND METHOD FOR RETRIEVING AND USING BLOCK FINGERPRINTS FOR DATA DEDUPLICATION

FIELD OF THE INVENTION

The present invention relates to storage systems and, more specifically, to a technique for efficiently reducing duplicate data in a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, managed according to a storage protocol, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize data containers for the information. For example, the information may be stored on the disks as a hierarchical structure of directories, files, and blocks. Each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

In a large file system, it is common to find duplicate occurrences of individual blocks of data. Duplication of data blocks may occur when, for example, two or more files or other data containers share common data or where a given set of data occurs at multiple places within a given file. Duplication of data blocks results in inefficient use of storage space by storing the identical data in a plurality of differing locations served by a storage system.

One technique that has been used to address this problem is referred to as "file folding". The basic principle of file folding is to allow new data of a file in the active file system to share a disk block with old data of the file in a persistent image if the new data are identical to the old data. This technique has been implemented in storage systems available from Network Appliance, Inc., of Sunnyvale, Calif. Specifically, these storage systems are capable of generating a persistent consistency point image (PCPI) of a specified set of data. A PCPI is a space conservative, point-in-time read-only image of data (such as a storage system) accessible by name that provides a consistent image of that data at some previous time. More particularly, a PCPI is a point-in-time representation of a storage element, such as an active file system, file or database, stored on a storage device (e.g., a disk) or other persistent memory and having a name or other identifier that distinguishes it from other PCPIs taken at other points in time. One example of a PCPI is a Snapshot™, as implemented in storage systems available from Network Appliance, Inc. The terms "PCPI" and "snapshot" may be used interchangeably throughout this patent without derogation of Network Appliance's trademark rights.

A technique for generating PCPIs is described in greater detail in commonly assigned U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, issued on Oct. 6, 1998, by David Hitz, et al. Illustratively, if a block within a data container that has been "Snapshotted" is modified, the storage system only creates the modified block for that data container in an active file system, rather than creating another complete (modified) copy of the data container. For each unmodified block, the storage system simply gives the data container a pointer to the corresponding block in the PCPI. In this way, the unmodified blocks in the PCPI become shared between the PCPI and the active file system. This technique is described in greater detail in commonly assigned U.S. Pat. No. 7,072,910, entitled FILE FOLDING TECHNIQUE, issued on Jul. 4, 2006, by Andy Kahn, et al.

File folding does help to more efficiently use storage space. However, it is desirable to reduce data duplication in an active file system without having to rely on a PCPI, such as a Snapshot. Furthermore, it is desirable to identify and eliminate duplicate data blocks which may occur in the active file system due to duplicate files or duplicate data within a single file. More generally, it is desirable to reduce data duplication regardless of the location of the data in the storage system.

Another technique for achieving a reduction in data duplication (deduplication) is described in U.S. Pat. No. 5,990,810, entitled METHOD FOR PARTITIONING A BLOCK OF DATA INTO BLOCKS AND FOR STORING AND COMMUNICATING SUCH SUBBLOCKS, by Ross Williams, issued Nov. 23, 1999 (hereafter "the '810 patent"). The method described in the '810 patent first utilizes a rolling hash function to generate a plurality of sub-blocks of data. The rolling hash utilizes a fixed size window of data that results in a boundary being placed between two sub-blocks. Once a block of data has been partitioned into sub-blocks, the hash value of each sub-block is calculated to form a table of hash values. The hash table is then used to determine if a new sub-block is identical to any sub-block whose hash value has previously been stored in the hash table. To perform this determination, the new sub-block's hash value is calculated and compared with the values contained in the hash table. If the new sub-block's hash value has been previously stored within the hash table, then the sub-block identified with the stored hash value is considered as identical with the new sub-block. In such a case, the new sub-block is replaced with a pointer to the previously stored sub-block, thereby reducing the amount of storage space required for the sub-block. A noted disadvantage of the technique described in the '810 patent is that it requires performance of an extensive number of computationally intensive hashing calculations, which may affect the overall performance of a storage system implementing such a method. Another noted disadvantage is that the hash table will become larger as the size of the data set increases and may not scale to large data sets such as terabytes or petabytes of data.

Another technique for eliminating duplicate data is described in commonly assigned U.S. patent application Ser. No. 11/105,895, filed on Apr. 13, 2005, entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al, the contents of which are hereby incorporated by reference. In the system described in this patent application, all data deduplication operations are performed on fixed size blocks that are illustratively 4 kilobytes (KB) in size. When a new block is to be stored, a hash value is computed as a fingerprint of the 4 KB block. The fingerprint is then compared with a hash table containing fingerprints of previously stored blocks. Should the new block's fingerprint be identical to that of a previously stored block, there is a high degree of probability that the new block is identical to the previously stored block. In such a case, the new block is replaced with a pointer to the previously stored block, thereby reducing storage resource consumption.

However, a disadvantage of this system is that it requires a hash computation when a new 4 KB block is stored. Such a computation may utilize additional processing resources, depending on the size of the fingerprint and the data block, which, in turn, may depend on the size of the storage system. Moreover, there is a slight probability that identical fingerprints will not indicate duplicate data. Illustratively, during the deduplication process, data blocks with identical fingerprints are still compared to verify that they are, in fact, identical. Therefore it is desirable to use fewer processing resources when generating the fingerprint, while preserving a reasonable degree of probability that identical fingerprints will indicate duplicate data, in order to facilitate duplicate block comparison during a subsequent deduplication process. Additionally, modem storage systems, such as the NetApp® Data ONTAP® operating system, may already implement a checksum operation to ensure the integrity of the data blocks stored on the systems. It is desirable to have the deduplication process leverage the existing storage functionalities to conserve processing resources.

SUMMARY OF THE INVENTION

The present invention overcomes the disadvantages of the prior art by optimizing block fingerprints to efficiently identify duplicate data blocks in a storage system. The identified duplicate data blocks are then compared by a data deduplication module, and duplicate data is eliminated to optimize performance of the storage system.

According to an illustrative embodiment of the invention, the storage system implements a high-level module, such as a file system, to logically organize information stored on a plurality of storage devices, such as disks, managed by a storage module. At an interface between the high-level module and the storage module, a fingerprint extraction layer generates a fingerprint of a predefined size, e.g., 64 bits, for each data block stored by the storage system. Illustratively, a first predetermined number of bits of the fingerprint are provided from the result of a checksum calculation performed by the storage module, while a second predetermined number of bits of the fingerprint are provided from data stored at one or more predefined offsets within the data block. Alternatively, the storage module and deduplication module may utilize the same 64-bit checksum value to serve different purposes. The resulting fingerprint sufficiently reflects the contents of the data block to enable identification of duplicates without an undesirable rate of false positives. Furthermore, because no additional cryptographic functions, such as hash functions, need to be performed to generate the fingerprint, processor utilization is reduced.

Each fingerprint is stored in a fingerprint record and the fingerprint records are, in turn, stored in a fingerprint database for access by the data deduplication module. The data deduplication module may periodically compare the fingerprints to identify duplicate fingerprints which, in turn, indicate duplicate data blocks. The duplicate data blocks are then compared, and duplicate data is eliminated.

According to the illustrative embodiment, each fingerprint record includes additional information about the fingerprinted data block. The data deduplication module may also periodically compare the additional information with metadata associated with the data blocks to ensure that the fingerprint database accurately reflects the most recent state of the storage system. "Stale" fingerprints (e.g., fingerprints associated with deleted and/or modified data blocks) may thereby be eliminated from the fingerprint database. Alternately, the process of eliminating stale fingerprints is triggered by a predefined condition, such as the fingerprint database reaching a predefined size or the process of eliminating stale fingerprints may immediately precede the above-described process in which fingerprints are compared.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
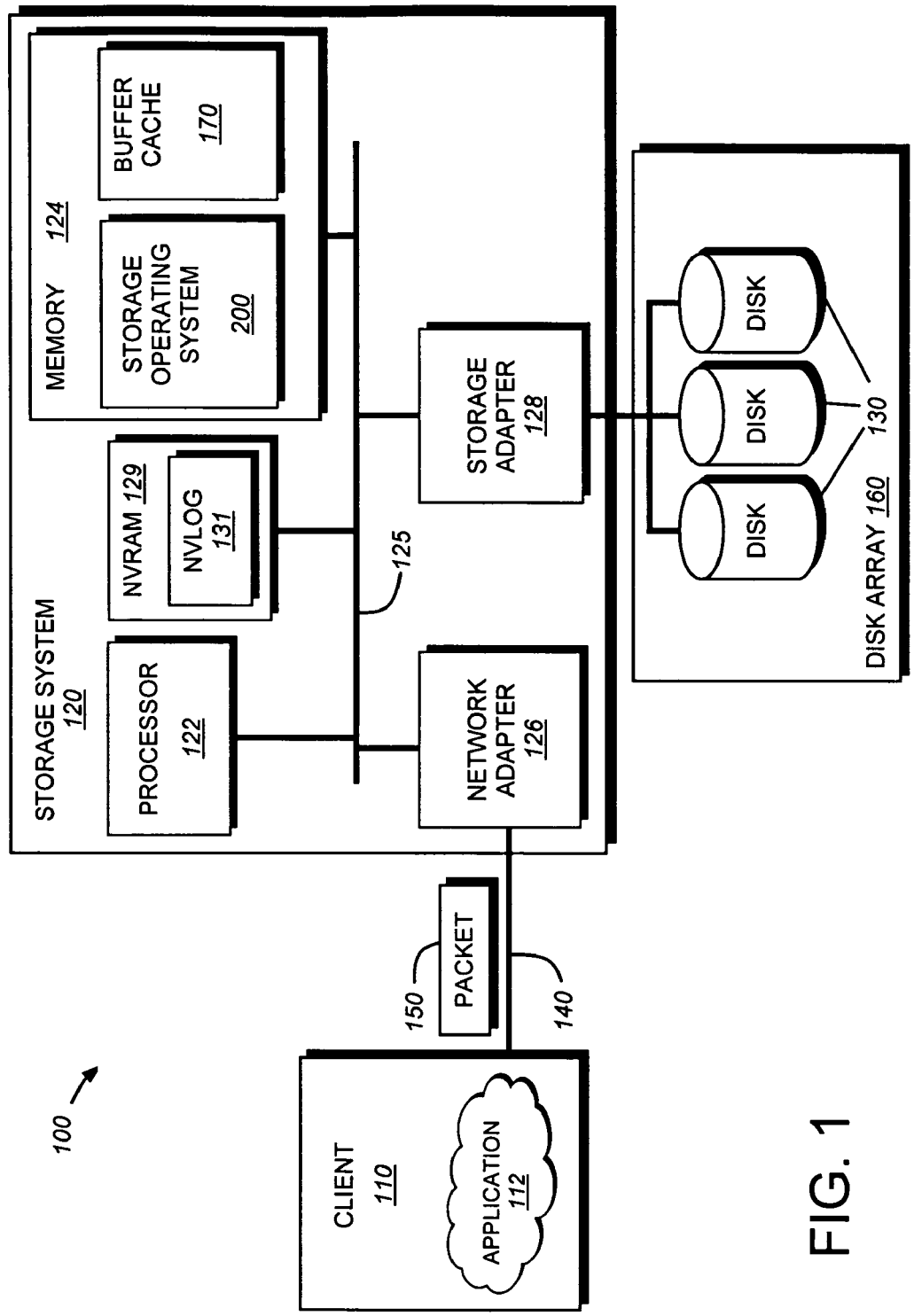
FIG. 1 is a schematic block diagram of storage system environment in accordance with an embodiment of the present invention.

FIG. 1 is a schematic block diagram of an illustrative storage system environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126, a non-volatile random access memory (NVRAM) 129 and a storage adapter 128 interconnected by a system bus 125. The storage system 120 also includes a storage operating system 200 that illustratively implements a high-level module, such as a file system, to logically organize the information as a hierarchical structure of directories, files, and special types of files called virtual disks (hereinafter "blocks") on the disks.

In the illustrative embodiment, the memory 124 comprises storage locations that are addressable by the processor 122 and adapters for storing software program code. A portion of the memory may be further organized as a "buffer cache" 170 for storing data structures, such as a fingerprint queue, associated with the present invention. Alternatively, the NVRAM 129 may be utilized to store the fingerprint queue, a fingerprint database, or any other data structures associated with the present invention. Additionally, in a system supporting persistent consistency point images (PCPIs) of the file system, the NVRAM 129 may be utilized for storing changes to the file system between consistency points. Such changes may be stored in a nonvolatile log (NVLOG) 131 that is, during the course of a consistency point, flushed (written) to disk. The processor 122 and adapters may, in turn, comprise processing elements and/or logic circuitry configured to execute the software program code and to manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets 150 of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client 110 may request the services of the storage system 120, and the system may return the results of the services requested by the client 110, by exchanging packets 150 over the network 140. The client 110 may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 130, such as hard disk drives (HDDs) and/or direct access storage devices (DASDs), of array 160. The storage adapter 128 includes input/output (I/O) interface circuitry that couples to the disks 130 over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID), managed according to a RAID protocol. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. The illustrative RAID protocol also implements a 32-bit checksum value for each block of data written to disk, to verify data integrity. The illustrative example of a RAID implementation is a RAID-4 level implementation, although it should be understood that other types and levels of RAID implementations may be used in accordance with the inventive principles described herein. Likewise, other implementations and/or protocols may be used to organize the disks of the logical volume/file system.

B. Storage Operating System

To facilitate access to the disks 130, the storage operating system 200 implements a write-anywhere file system that cooperates with virtualization modules to "virtualize" the storage space provided by disks 130. Illustratively, the file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif., that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
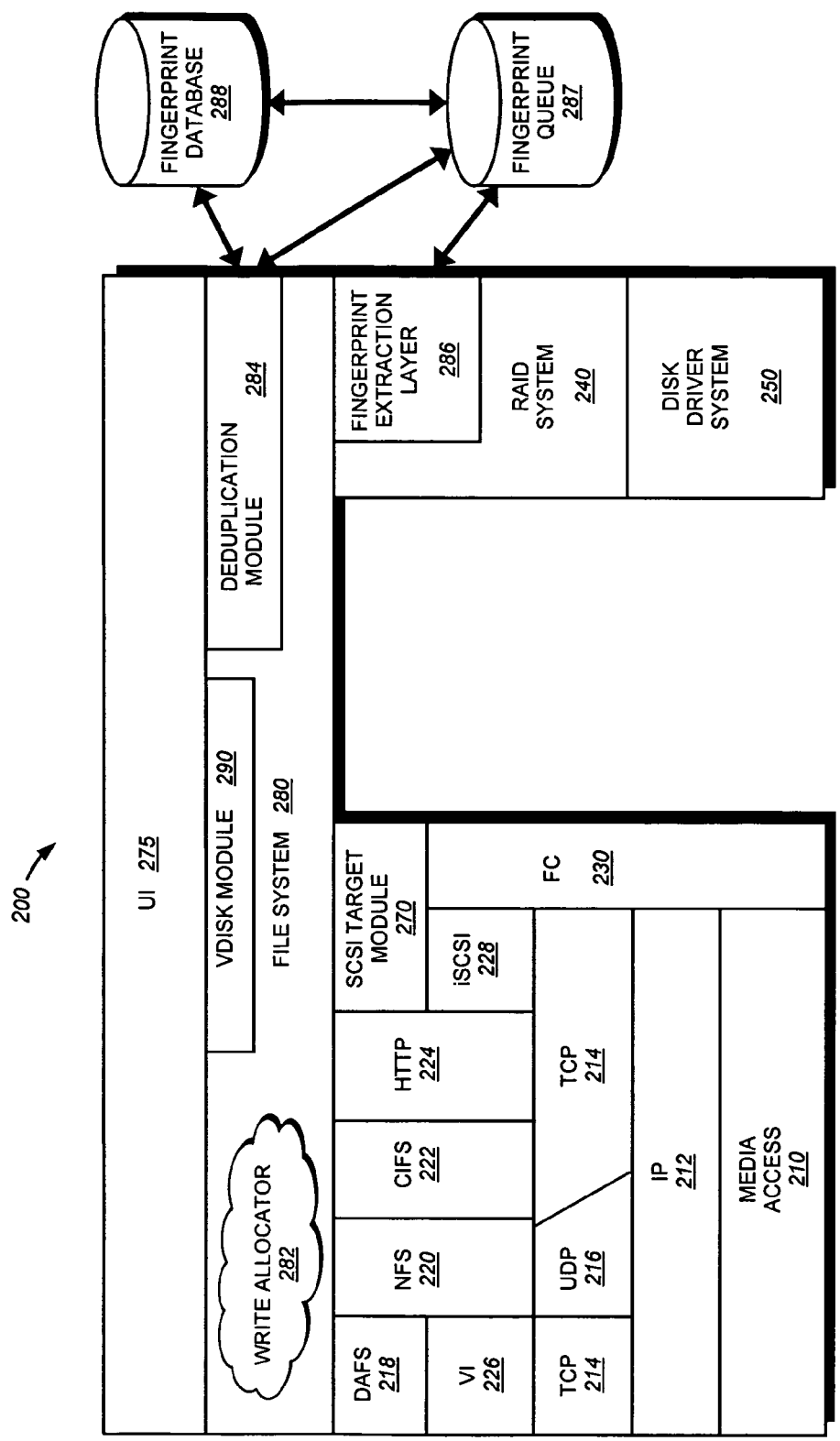
FIG. 2 is a schematic block diagram of a storage operating system in accordance with an embodiment of the present invention.

FIG. 2 is a schematic block diagram of a storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222, and the Hypertext Transfer Protocol (HTTP) protocol 224. A Virtual Interface (VI) layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that implements a storage (e.g., RAID) protocol manage the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

According to an illustrative embodiment of the present invention, the storage operating system 200 further includes a deduplication module 284 and a fingerprint extraction layer 286 disposed between the file system 280 and the RAID system 240. The deduplication module 284 may execute a data duplication process periodically, in response to a predefined condition (e.g., the storage system reaching a predefined capacity), and/or in response to a command from an administrator or user, through the UI 275. The deduplication module 284 and fingerprint extraction layer 286 communicate with a fingerprint queue 287 and a fingerprint database 288, each of which stores fingerprint records which, in turn, are used to identify duplicate data blocks. Illustratively, the fingerprint queue 287 and fingerprint database 288 reside in the storage system memory 124 and/or NVRAM 129 although, in alternate embodiments, they may be separately stored to a disk and/or any other computer readable medium. Also, according to alternate embodiments, the deduplication module 284 may be integrated into a write allocator process 282, to perform a data deduplication procedure during the allocation of write operations to the disk array 160. Such a data deduplication procedure may modify pointers within indirect blocks to point to a single data block instead of multiple data blocks containing identical data as described in the above-incorporated U.S. patent application entitled METHOD AND APPARATUS FOR IDENTIFYING AND ELIMINATING DUPLICATE DATA BLOCKS AND SHARING DATA BLOCKS IN A STORAGE SYSTEM.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write-anywhere file system (such as the WAFL® file system available from Network Appliance, Inc., Sunnyvale, Calif.) having an on-disk format representation that is block-based using, e.g., 4 kilobyte (KB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a read request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk, dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

A write operation issued by the client 110 to the storage system 120 follows the same "path" through the storage system 100, except that the operation may be temporarily stored ("queued") in the NVLOG 131 of the NVRAM 129 for later commitment to disk 130. Likewise, the write operation follows the same software "path" through the storage operating system 200 layers, except that the fingerprint extraction layer 286 and/or deduplication module 284 may extract data such as metadata associated with the appropriate entry in the inode file during the operation, in order to build a fingerprint record corresponding to the logical vbn modified by the write operation.

It should be noted that the software "path" through the storage operating system layers described above needed to perform data storage access and write operations for client requests received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software operating as a single or distributed system.

As used herein, the term "storage operating system" generally refers to the computer-executable code operable to perform a storage function in a storage system, e.g., that manages data access and may, in the case of a file server, implement file system semantics. In this sense, the Data ONTAP® software is an example of such a storage operating system implemented as a microkernel and including the file system 280 to implement the WAFL® file system semantics and manage data access. Illustratively, the storage operating system 200 includes a deduplication module 284 for comparing fingerprints and implementing data deduplication according to the present invention, however, in alternate embodiments, the fingerprint comparison and data deduplication functionality may be implemented in other modules of the storage operating system 200. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer, or multi-protocol storage appliance) or general-purpose computer, including a standalone computer or portion thereof, embodied as or including a storage system 120. An example of a multi-protocol storage appliance that may be advantageously used with the present invention is described in commonly owned U.S. Pat. No. 7,873,700, filed on Aug. 8, 2002, and issued on Jan. 18, 2011, titled MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems.

C. On-Disk File System Structures

Figure 3:
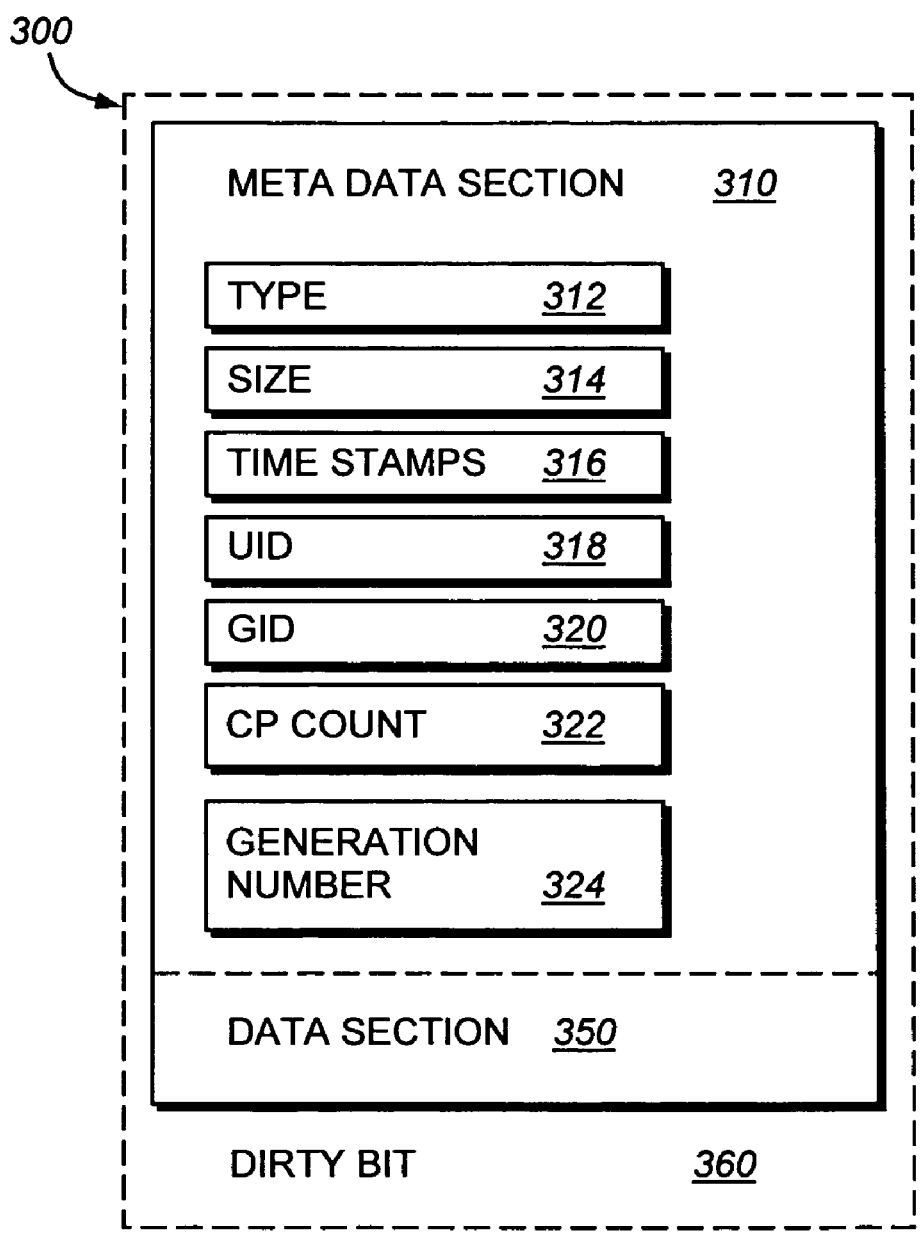
FIG. 3 is a schematic block diagram of an inode in accordance with an embodiment of the present invention.

In the illustrative embodiment, a file (or other data container) is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file, ownership, i.e., user identifier (UID 318) and group ID (GID 320), of the file, a consistency point (CP) count field 322, and a generation number field 324.

The CP count field 322 identifies the CP count at which this particular version of the inode was generated. Illustratively, each CP is identified with a unique CP number that is generated by a monotonically increasing CP counter. In alternate embodiments, the CP count may be generated using other techniques to provide each CP with a unique identifier. The generation number field 324 identifies the generation of this particular inode. Illustratively, each time an inode is deleted and reused, its associated generation number field 324 is incremented. In a write anywhere file system, any time an inode is modified, a new copy is written to disk. At such time, i.e., during inode write allocation, these fields 322, 324 are updated. Thus, the generation number reflects inode creation/allocation, and the CP count reflects inode modification. The fields 322, 324 may be utilized to quickly determine whether a particular data container represented by the inode has been modified since the time a fingerprint of the data container was generated.

The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 may include a representation of the data associated with the file.

According to the illustrative embodiment, the data section 350 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL® file system, including the inodes and inode file, are disclosed and described in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998, and herein incorporated by reference.

Figure 4:
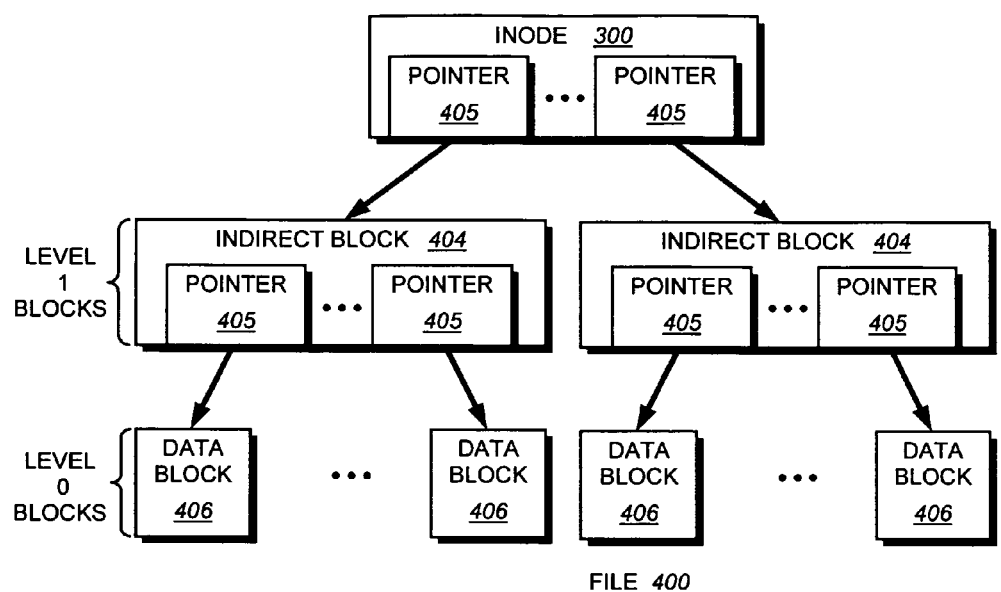
FIG. 4 is a schematic block diagram of a buffer tree of a data container in accordance with an embodiment of the present invention.

FIG. 4 is a schematic block diagram of a buffer tree of a data container that may be advantageously used with the present invention. The buffer tree is an internal representation of blocks for a data container (e.g., file 400) loaded into the buffer cache 170 and maintained by the write-anywhere file system 280. A root (top-level) inode 300, such as an embedded inode, references indirect (e.g., level 1) blocks 404. The indirect blocks (and inode) contain pointers 405 that ultimately reference data blocks 406 used to store the actual data of file 400. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

D. Data Deduplication

Figure 5:
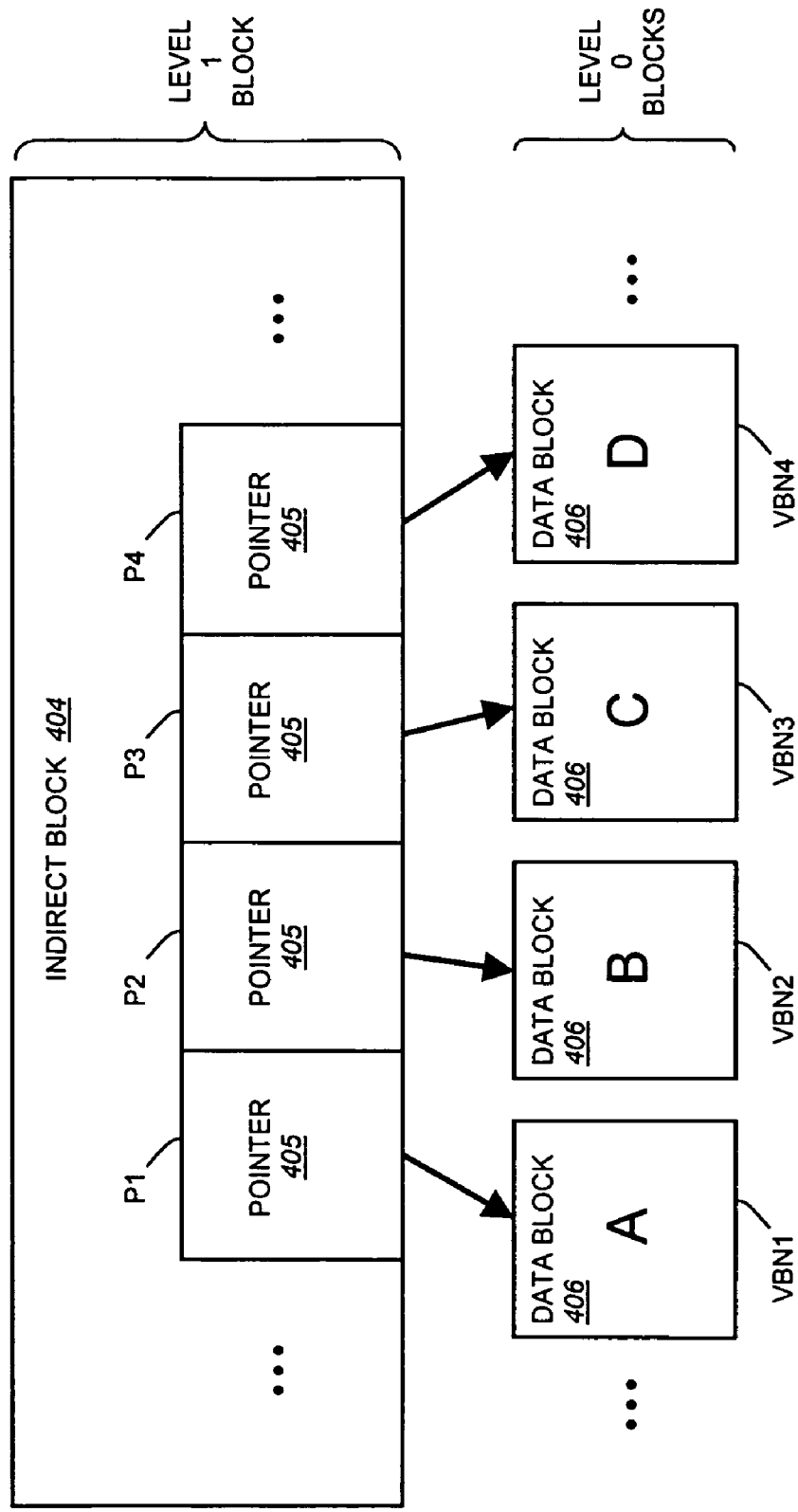
FIG. 5 is a schematic block diagram of an indirect block with pointers to data blocks in accordance with an embodiment of the present invention.

FIG. 5 is a schematic block diagram of a level 1 indirect block 404 having pointers to a data blocks 406 in accordance with an embodiment of the present invention. Illustratively, each data block 406 contains 4 KB of data. Notably, according to the write anywhere file layout, the level 0 data blocks may be located anywhere in the file system (i.e., they do not necessarily correspond to physically sequential blocks on a disk 130). In a storage operating system 200 adapted to eliminate and/or deduplicate data, the data within each data block 406 may be associated with a fingerprint. For example, the illustrative data container contains a sequence of data blocks stored at, e.g., vbn1, vbn2, vbn3, and vbn4. Each unique data block is associated with a unique fingerprint, e.g., A, B, C, and D. Likewise, within the indirect block 404, a sequence of pointers, 405 e.g., P1, P2, P3, and P4, reference the data blocks vbn1, vbn2, vbn3, and vbn4 respectively.

Figure 6:
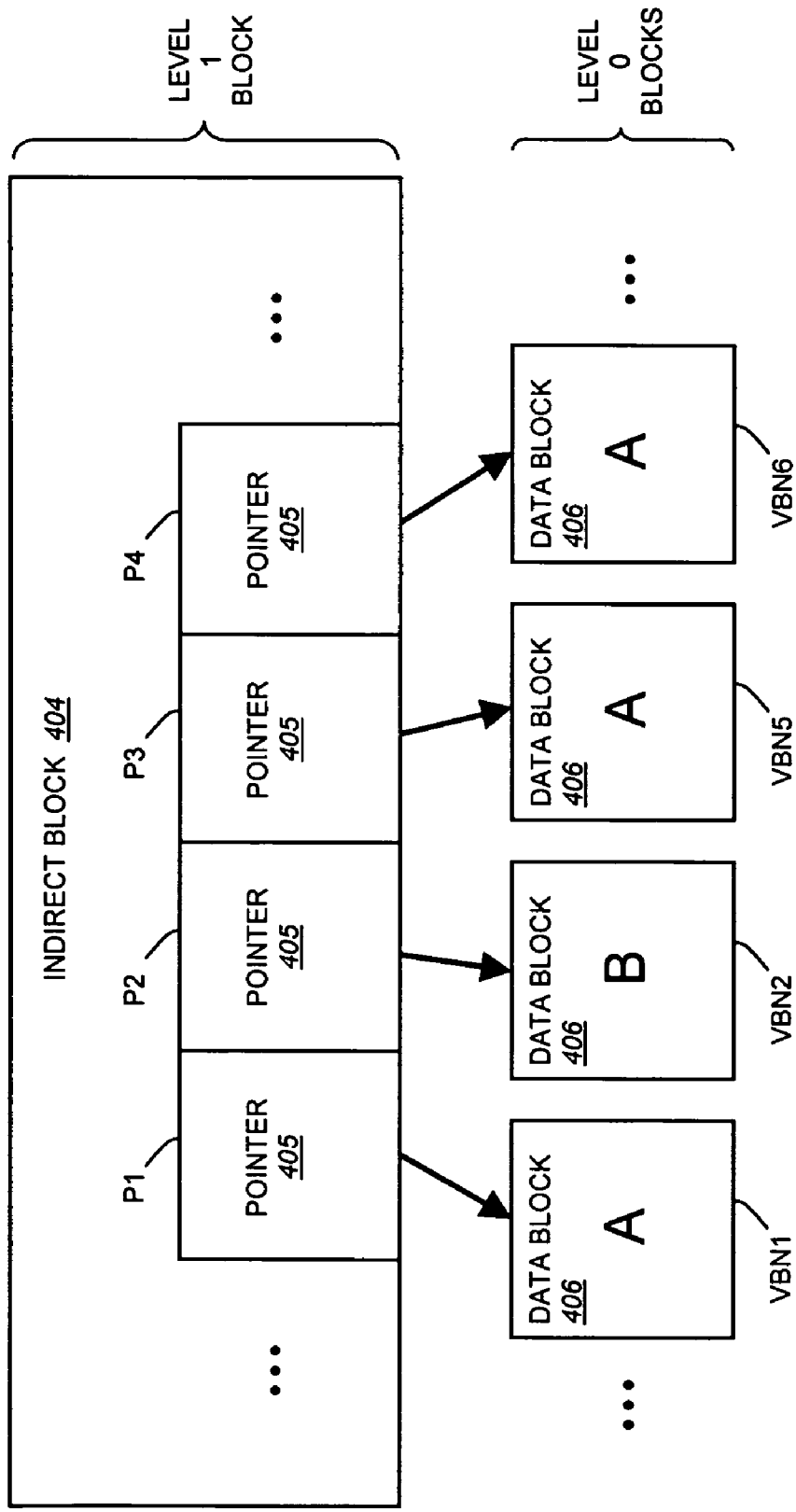
FIG. 6 is a schematic block diagram of an indirect block with pointers to modified data blocks in accordance with an embodiment of the present invention.

FIG. 6 is a schematic block diagram of the level 1 indirect block 404 of FIG. 5 after write operations have modified the data container. Illustratively, the two data blocks previously stored at vbn3 and vbn4 have been modified to now contain a copy of the first data block stored at vbn 1, thereby making their associated fingerprints identical. The modified data blocks now are associated with fingerprints A, B, A, and A respectively. According to the write anywhere file layout, two new vbns (vbn5 and vbn6) are allocated for the modified data. As a result, the deduplication module 284 may utilize the identical fingerprints to determine that the data blocks 406 stored at vbn5 and vbn6 contain a duplicate of the data stored in the data block 406 at vbn1. Having three copies of identical data is wasteful of file system resources; therefore the deduplication module 284 may modify pointers P3 and P4 to reference vbn1, thereby de-allocating vbn5 and vbn6 and conserving storage space while preserving the integrity of the data container.

Figure 7:
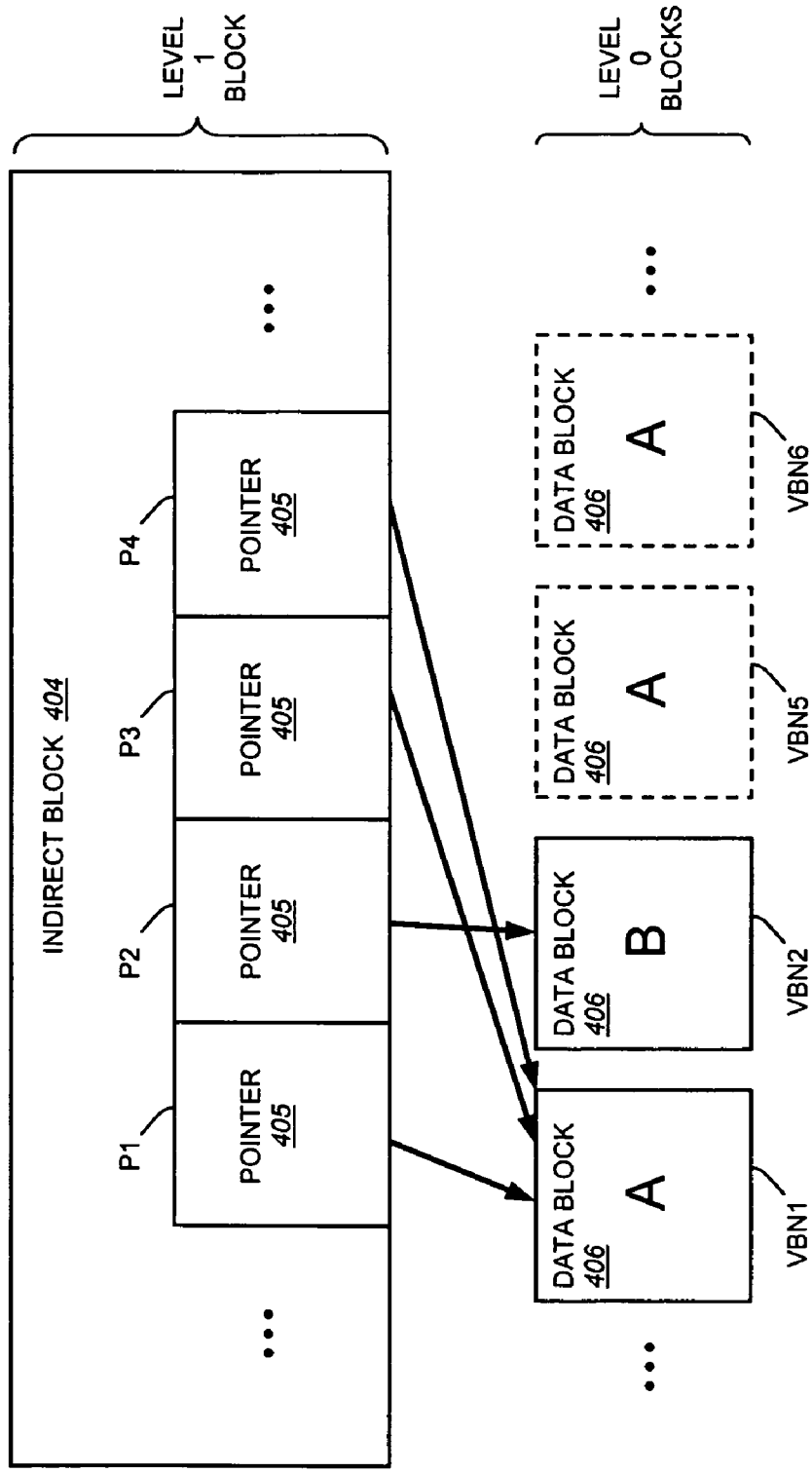
FIG. 7 is a schematic block diagram of an indirect block with pointers to deduplicated data blocks in accordance with an embodiment of the present invention.

FIG. 7 is a schematic block diagram illustrating the level 1 indirect block 404 of FIG. 6 after performance of an exemplary data deduplication procedure. After the exemplary procedure, each unique data block is associated with a unique fingerprint, and identical file blocks of the data container are associated with a unique data block, which, in turn, is associated with a unique fingerprint. A technique for implementing the deduplication procedure is further described in the above-incorporated United States patent application entitled METHOD AND APPARATUS FOR IDENTIFYING AND ELIMINATING DUPLICATE DATA BLOCKS AND SHARING DATA BLOCKS IN A STORAGE SYSTEM.

E. Generating Fingerprint Records

According to an illustrative embodiment of the invention, the storage system 120 implements a high-level module, such as a file system 280, to logically organize information stored on a plurality of storage devices, such as disks 130, managed by a storage module, such as RAID system 240. At an interface between the high-level module and the storage module, a fingerprint extraction layer 286 generates a fingerprint of a predefined size, e.g., 64 bits, for each data block 406 stored by the storage system 120. Illustratively, a first predetermined number of bits, e.g., the first 32 bits, of the fingerprint are provided from the result of a checksum calculation performed by the storage module, while a second predetermined number of bits, e.g., the second 32 bits, of the fingerprint are provided from data stored at one or more predefined offsets within the data block 406. The resulting fingerprint sufficiently reflects the contents of the data block 406 to enable identification of duplicates without an undesirable rate of false positives. Furthermore, because no additional cryptographic functions, such as hash functions, need to be performed to generate the fingerprint, processor utilization is reduced.

Additionally, the fingerprint extraction layer 286 may choose to generate fingerprints for a subset of data blocks based on certain policies. For example, data blocks belonging to user files (as opposed to internal metadata files used by the file system) may be fingerprinted. Alternately, level 0 blocks 406 (as opposed to indirect blocks 404) may be fingerprinted.

Each fingerprint is stored in a fingerprint record, and the fingerprint records are, in turn, stored in fingerprint database 288 for access by the data deduplication module 284. The data deduplication module 284 may periodically compare the fingerprints to identify duplicate fingerprints which, in turn, indicate duplicate data blocks 406. The duplicate data blocks 406 are then compared, and duplicate data is eliminated.

Figure 8:
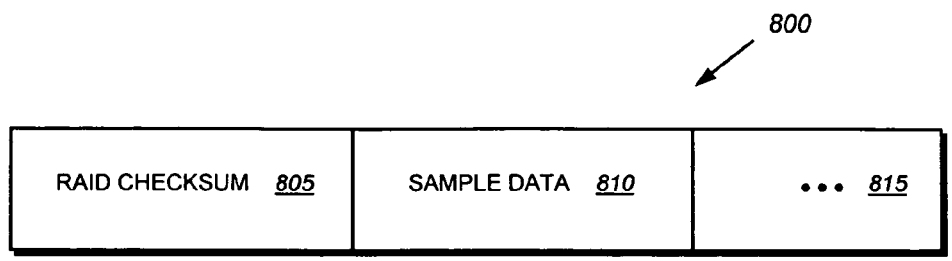
FIG. 8 is a schematic block diagram of a fingerprint in accordance with an embodiment of the present invention.

According to an illustrative embodiment of the present invention, the fingerprint extraction layer 286 generates a 64-bit fingerprint for each data block 406 stored by the storage system 120. FIG. 8 is a schematic block diagram showing elements of an exemplary fingerprint 800. The fingerprint 800 illustratively comprises a RAID checksum field 805, a sample data field 810, and, in alternate embodiments, additional fields 815. It should be noted that in alternate embodiments additional and/or differing fields may be utilized. Alternatively, the fingerprint 800 may comprise the RAID checksum alone if the RAID checksum comprises a checksum function that sufficiently meets the needs of the deduplication module.

As part of a typical write operation, the well-known RAID protocol verifies data integrity by implementing a checksum calculation for each block of data written to disk. Illustratively, for each write operation directed to a data block 406, the fingerprint extraction layer 286 identifies and copies a 32-bit checksum value, calculated according to the RAID protocol, into the RAID checksum field 805 of the fingerprint 800. Thus, the process of generating fingerprints is optimized to take advantage of a pre-calculated checksum value associated with each data block 406. Alternately, the RAID checksum field 805 may include only a portion of the 32-bit checksum value calculated according to the RAID protocol, either alone or in combination with other values. Likewise, where the storage protocol generates a checksum value other than a 32-bit RAID checksum value, the fingerprint 800 may implement this other checksum value in the RAID checksum field 805. Alternately, the RAID checksum field 805 may include the results of other cryptographic functions, such as a hash function, associated with data stored in the data block 406.

Illustratively, the sample data field 810 contains a copy of data stored at one or more predefined offsets within the data block 406 associated with the fingerprint 800. For example, where the data block 406 contains 4 KB of data, the sample data field 810 may be 32 bits (4 bytes) long, containing a copy of every 1024th bit (i.e., the first bit of every 128th byte) stored in the data block 406. Alternately, the sample data field 810 may contain a copy of 32 contiguous bits stored at a single offset within the data block 406. The resulting fingerprint 800 sufficiently reflects the contents of the data block 406 to enable identification of duplicates without an undesirable rate of false positives. Thus, again, the process of generating fingerprints is optimized to take advantage of data already provided to the storage operating system 200, without requiring additional hash calculations and/or cryptographic functions to be performed by the storage operating system 200. According to the alternate embodiments, the RAID checksum field 805 and sample data field 810 may be combined with additional fields 815 containing other data associated with the data block 406, including, e.g., the result of additional hash calculations and/or cryptographic functions performed by the storage operating system 200.

Figure 9:
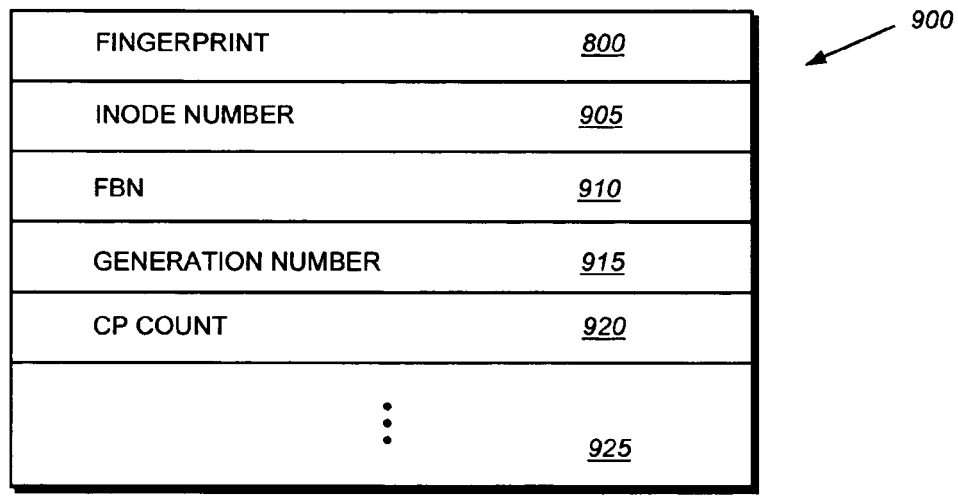
FIG. 9 is a schematic block diagram of a fingerprint record in accordance with an embodiment of the present invention.

Each fingerprint is stored in a fingerprint record generated by the data deduplication module 284. FIG. 9 is a schematic block diagram of a fingerprint record 900 that may be advantageously used in accordance with the present invention. The fingerprint record 900 comprises a field for storing the fingerprint 800, an inode number field 905, a file block number (fbn) field 910, a generation number field 915, a consistency point (CP) count field 920, and, in alternate embodiments, additional fields 925. The inode number field 905 stores a pointer to the inode 300 for the fingerprinted data block 406. The fbn field 910 stores the offset of the block within the data container. For example, where the data container includes a plurality of data blocks 406, a value in the fbn field 910 identifies which data block 406 corresponds to the fingerprint 800. The other fields 915, 920, 925 of the fingerprint record 900 may be gathered from the metadata section 310 of the block's inode 300 during a write operation. For example, the values stored in the CP count field 322 and the generation number field 324 of the inode 300 may be copied to the CP count field 920 and the generation number field 915 of the fingerprint record 900, respectively. Thus, the fingerprint record 900 stores data associated with the fingerprint 800 to provide additional fingerprint handling functionality to the storage operating system.

Figure 10:
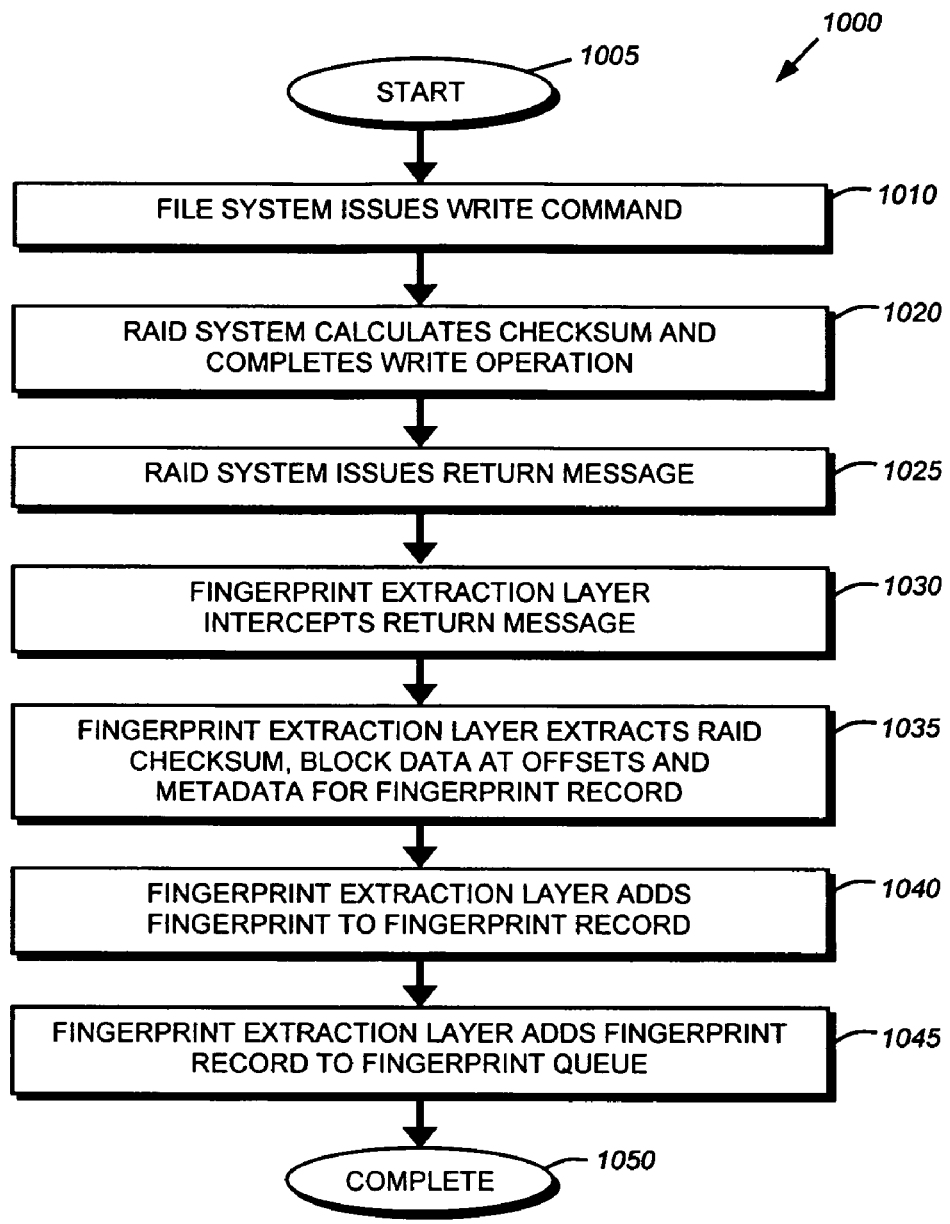
FIG. 10 is a flowchart detailing the steps of a procedure for generating a fingerprint record in accordance with an embodiment of the present invention.

FIG. 10 is a flowchart detailing the steps of a procedure 1000 for generating a fingerprint record 900 in accordance with an embodiment of the present invention. The procedure 1000 begins at step 1005 and proceeds to step 1010 where the file system 280 of the storage operating system 200 issues a write command to the RAID system 240. For example, the write command may originate from a client 110 connected to the storage system 120 and may be a command to write a new data block 406 of a new data container. Alternatively, the write command may be a command to modify the data of a preexisting data container by allocating a new data block 406 according to the write anywhere file layout.

The procedure 1000 proceeds to step 1020, where the RAID system calculates a 32-bit checksum value and completes the write operation, e.g., by sending the operation through the disk driver system 250. At step 1025, the RAID system 240 then returns a confirmation message to the file system 280. Note that other storage protocols, i.e., other than the RAID protocol, may be implemented to execute the write operation and to return a value as the checksum value. At step 1030, the fingerprint extraction layer 286 intercepts and/or monitors the confirmation message from the RAID system 240. At step 1035, the fingerprint extraction layer 286 extracts the 32-bit checksum value from the confirmation message and copies this value into the RAID checksum field 805 of the fingerprint 800. The fingerprint extraction layer 286 also samples 32 bits of data of the data block 406 at one or more offsets and copies this data into the sample data field 810 of the fingerprint 800 thus generating a 64-bit fingerprint 800. Additionally, the fingerprint extraction layer 286 extracts metadata associated with the data block 406. A fingerprint record 900 is generated (e.g., by allocating one or memory entries to store the fields of the fingerprint record 900), and the extracted metadata is copied to appropriate fields of the fingerprint record 900. According to an alternate embodiment, the fingerprint extraction layer 286 may be triggered, in response to the write command, to generate data for the fields based on data provided by the file system 280.

The procedure 1000 continues to step 1040, where the fingerprint 800 is added to the fingerprint record 900. At step 1045, the fingerprint record 900 is added to the fingerprint queue 287, where newly generated fingerprints are accumulated for batch processing by the deduplication module 284, as described below in reference to FIG. 11. At step 1050, the procedure 1000 completes.

Note that, according to alternate embodiments, the fingerprint record generation procedure 1000 may occur periodically or in response to a predefined condition, such as an administrator command being received from the UI 275, rather than during write operations. In such embodiments, the file system 280 may scan the disk array 160, or a portion thereof, to generate the fingerprint records.

Illustratively, the data deduplication module 284 periodically compares the fingerprints to identify duplicate fingerprints, which, in turn, indicate duplicate data blocks. Note that, according to the illustrative embodiment, a pair of duplicate fingerprints might be "false positives", meaning they do not correspond to actual duplicate data blocks. Therefore, prior to deduplication, the identified data blocks are compared byte-by-byte to verify that they are actual duplicates. Illustratively, where each fingerprint 800 comprises a 32-bit RAID checksum and 32 bits of sample data, storage system processing resources are conserved during the fingerprint record generation procedure 1000 in exchange for a probability of false positives during data deduplication. However, the probability of false positives is sufficiently low (approximately 100 false positives per 4 billion data blocks) that the amount of processor resources conserved by using pre-calculated data to generate the fingerprint 800 outweighs the amount of processor resources expended by performing byte-by-byte comparisons during data deduplication. Additionally, the deduplication process may be executed during periods of low system activity, e.g., late at night or on is weekends. Therefore, references to "identical" or "duplicate" data blocks, as used herein, should be interpreted to possibly include a low percentage of data blocks that are not, in fact, duplicates (i.e., false positives).

According to alternate embodiments, however, different values may be copied into the RAID checksum and sample data fields 805, 810, and/or additional fields 815 may be implemented in each fingerprint 800. For example, the fingerprint 800 may include, e.g., the result of a cryptographic hash function that guarantees a zero probability of false positives. Therefore, according to alternate embodiments, performing byte-by-byte data block comparisons during data deduplication may be unnecessary.

F. Identifying Duplicate Data Blocks

Figure 11:
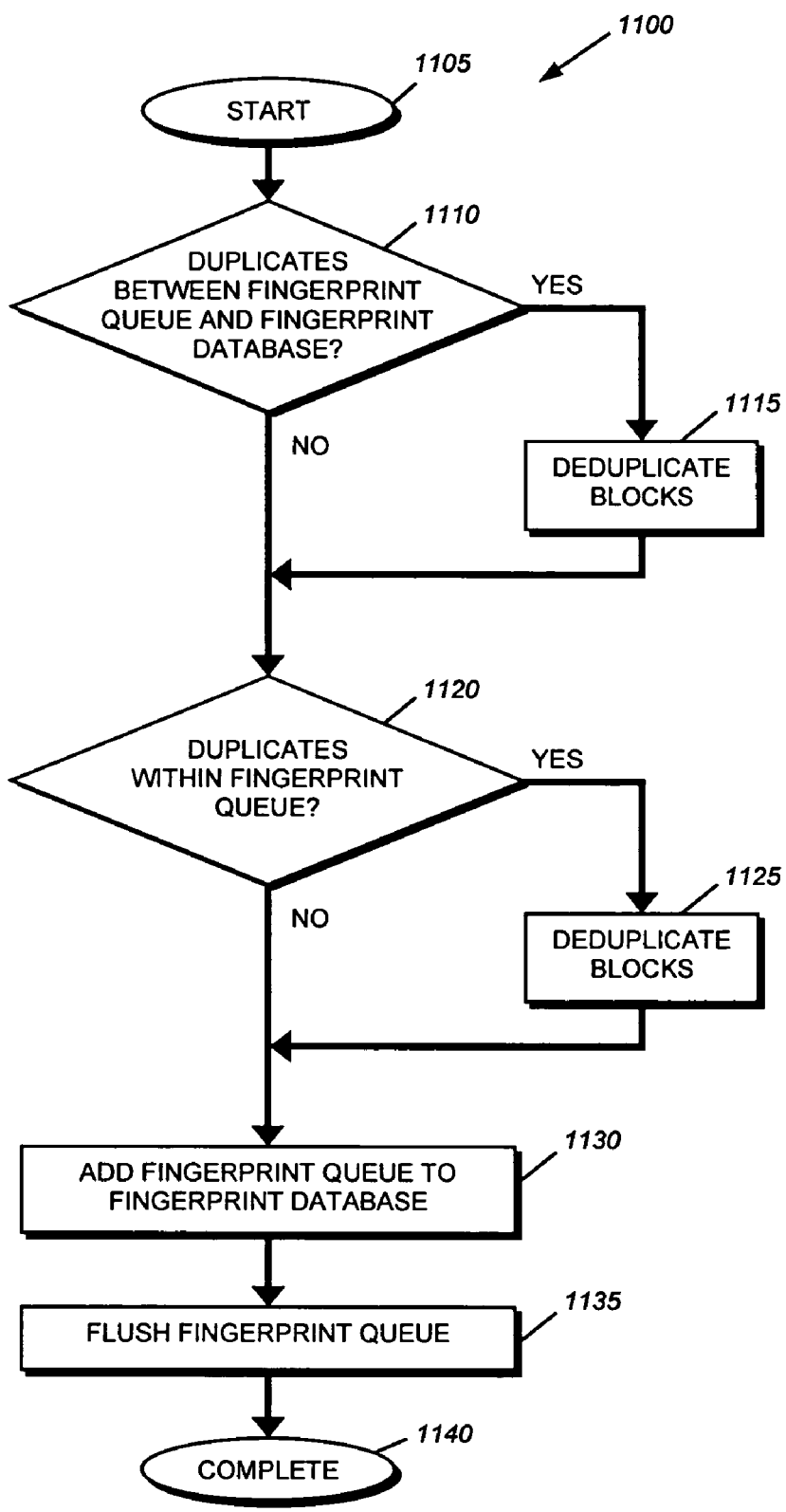
FIG. 11 is a flowchart detailing the steps of a procedure for identifying duplicate data blocks in accordance with an embodiment of the present invention.

FIG. 11 is a flowchart detailing the steps of a procedure 1100 for identifying duplicate data blocks 406 in accordance with an embodiment of the present invention. The procedure 1100 begins at step 1105 and continues to step 1110, where fingerprints stored in the fingerprint queue 287 are compared to fingerprints stored in the fingerprint database 288. If any of the fingerprints are identical, the procedure 1100 continues to step 1115 where the deduplication module 284 performs data deduplication, e.g., by performing byte-by-byte comparisons between the data blocks associated with the identical fingerprints followed by modifying pointers in indirect blocks. At step 1120, fingerprints stored in the fingerprint queue 287 are then compared to other fingerprints stored in the fingerprint queue 287. Illustratively, the comparison is a bitwise comparison between two fingerprints, performed by the deduplication module 284. According to alternate embodiments, the comparison may be, e.g., bytewise and/or another method of identifying identical data. If any of the fingerprints are identical, the procedure 1100 continues to step 1125 where the deduplication module 284 performs data deduplication, as illustrated above in reference to FIGS. 5, 6, and 7. The procedure 1100 then continues to step 1130, where the fingerprint records stored in the fingerprint queue 287 are copied to the fingerprint database 288. At step 1135, the fingerprint queue 287 is then flushed, i.e., all fingerprint records in the fingerprint queue 287 are deleted. The procedure 1100 completes at step 1140.

Notably, according to the illustrative embodiment, the above-described procedure 1100 may be executed on an active file system. Therefore, there may be more than one fingperint queue present in the storage operating system 200. While deduplication module 284 is accessing one of the queues, write operations may continue during the procedure 1100, with newly generated fingerprint records being stored to a second fingerprint queue or to a temporary memory location. By storing newly generated fingerprint records in a fingerprint queue 287, rather than in the fingerprint database 288, fingerprints corresponding to newly-written or recently-modified data blocks may be "batched" for processing as a group. Alternatively, newly generated fingerprint records may be stored directly to the fingerprint database 288 for immediate comparison and processing. The fingerprint database 288 may also be sorted according to the order of fingerprint creation, effectively creating a fingerprint queue at one end of the fingerprint database 288, which may then be processed as a batch according to procedure 1100, without requiring a separate fingerprint queue 287. According to yet another alternate embodiment, newly generated fingerprint records may be stored directly to the fingerprint database 288, sorted according to fingerprint value 800, with the deduplication module 284 periodically scanning the entirety or sections of the fingerprint database 288 for duplicates.

Figure 12A:
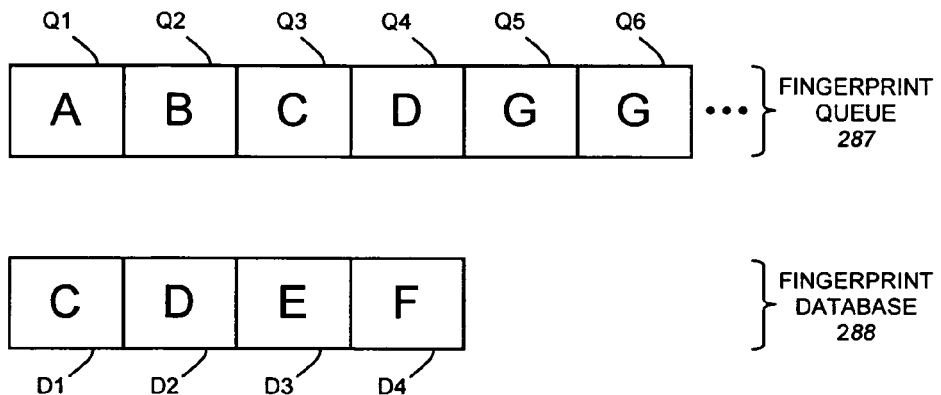
FIGS. 12A-12D are schematic block diagrams of a fingerprint queue and a fingerprint database illustrating identification of duplicate data blocks in accordance with an embodiment of the present invention.

According to the illustrative embodiment, the fingerprint records 900 of the fingerprint queue 287 and the fingerprint database 288 are sorted based on the value of their fingerprints 800 to facilitate comparisons between fingerprints 800. For example, FIG. 12A illustrates a sorted fingerprint queue 287 and a sorted fingerprint database 288. Illustratively, the fingerprints 800 are represented by letters A through G; locations within the fingerprint queue 287 are represented as Q1 through Q6; and locations within the fingerprint database 288 are represented as D1 through D4.

Figure 12B:
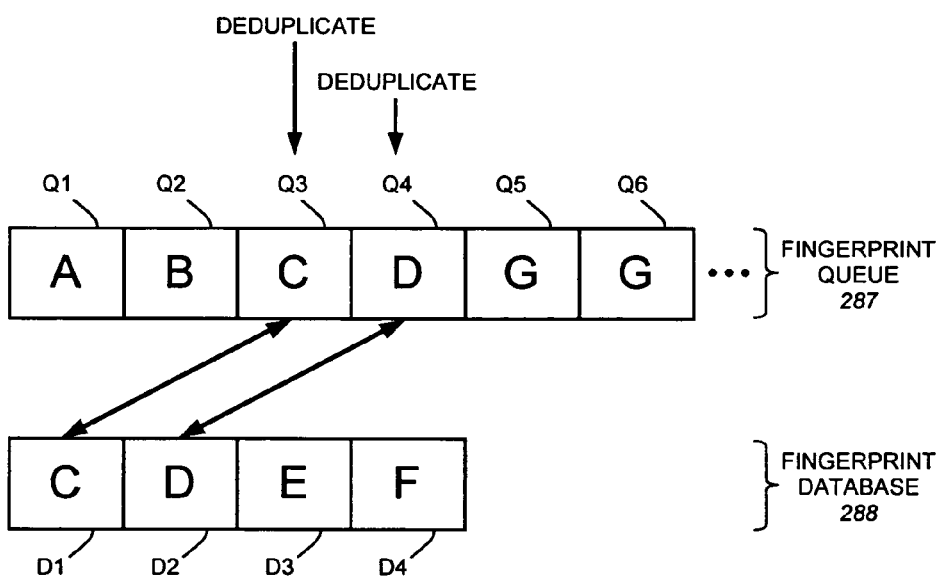

During steps 1110 and 1115 of the above-described procedure 1100, identical fingerprints in both the fingerprint queue 287 and fingerprint database 288 are identified and their corresponding data blocks are deduplicated. For example, FIG. 12B illustrates identified duplicate fingerprints ("C" and "D"). The data blocks associated with the fingerprint records stored at memory locations Q3 and D1 may be compared to determine whether they are actual duplicate data blocks. Likewise, the data blocks associated with the fingerprint records stored at memory locations Q4 and D2 may be compared. A technique for performing this comparison and for deduplicating actual duplicate data blocks is disclosed in the above-referenced United States patent application entitled METHOD AND APPARATUS FOR IDENTIFYING AND ELIMINATING DUPLICATE DATA BLOCKS AND SHARING DATA BLOCKS IN A STORAGE SYSTEM.

Figure 12C:
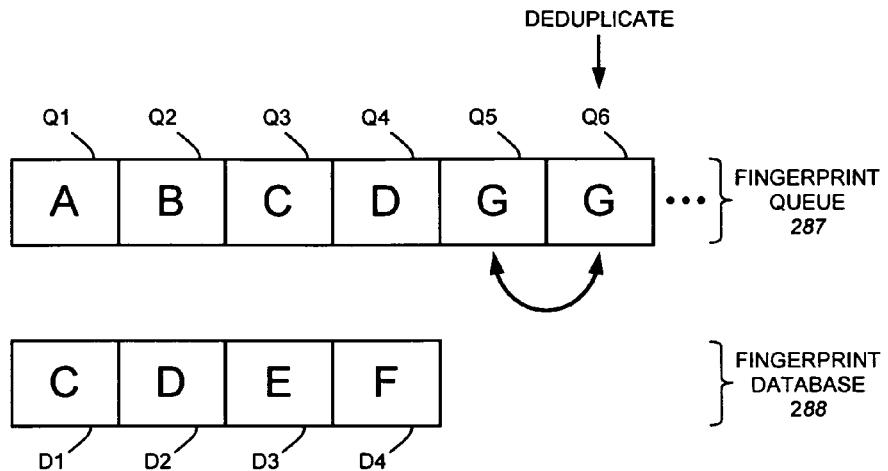

During steps 1120 and 1125 of the above-described procedure 1100, identical fingerprints within the fingerprint queue 287 are identified and their corresponding data blocks are deduplicated. For example, FIG. 12C illustrates an identified duplicate fingerprint ("G") within the fingerprint queue 287. The data blocks associated with the fingerprint records stored at memory locations Q5 and Q6 may be compared to determine whether they are actual duplicate data blocks.

Figure 12D:
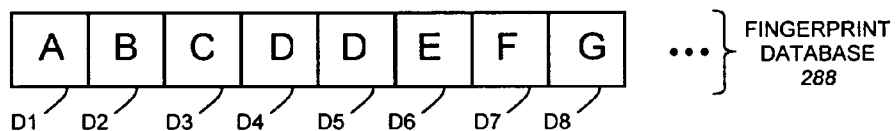

Actual duplicate data blocks and their corresponding fingerprint records are eliminated, and the fingerprint queue 287 is added to the fingerprint database 288 at step 1130 of the above-described procedure 1100. The resulting merged fingerprint database 288 is sorted according to fingerprint value 800. According to the illustrative embodiment, where there is a probability of false positives, fingerprint records containing false positive fingerprints may be retained. For example, FIG. 12D illustrates a merged and sorted fingerprint database 288 after completion of the procedure 1100. Illustratively, fingerprints "C" and "G" corresponded to actual duplicate data blocks, but fingerprint "D" was a false positive. Therefore, the duplicates of fingerprints "C" and "G" were eliminated, and their corresponding data blocks were deduplicated. The duplicate of fingerprint "D", however, was retained and merged into the fingerprint database 288. If a new data block with fingerprint "D" were to be created, then it would be compared to either one or both of the preexisting data blocks with a "D" fingerprint.

G. Eliminating Stale Fingerprints

According to the illustrative embodiment, each fingerprint record 900 includes additional information about the fingerprinted data block 406. The data deduplication module 284 may periodically compare the additional information with metadata associated with the data blocks 406 to ensure that the fingerprint database 288 accurately reflects the most recent state of the storage system. "Stale" fingerprints (e.g., fingerprints associated with deleted and/or modified data blocks) may thereby be eliminated from the fingerprint database 288. Alternately, the process of eliminating stale fingerprints is triggered by a predefined condition, such as the fingerprint database 288 reaching a predefined size or the process of eliminating stale fingerprints may immediately precede the above-described process in which fingerprints are compared. Alternatively, the fingeprints may be deleted when they become stale, i.e., at the time when the corresponding data blocks have been deleted or modified.

According to an illustrative embodiment, a new fingerprint record 900 is generated each time a write operation is directed to the RAID system 240. Thus, when multiple write operations are directed to the same data block, multiple fingerprint records may be generated, but only the most recent fingerprint record may accurately reflect the data block. Likewise, a data block may be deleted and/or reallocated, rendering the corresponding fingerprint record obsolete. Therefore, "stale" fingerprint records (e.g., fingerprint records associated with deleted or modified data blocks) should be eliminated from the fingerprint database 288 in order to improve performance and/or to reduce the space consumed by the fingerprint database 288.

Figure 13:
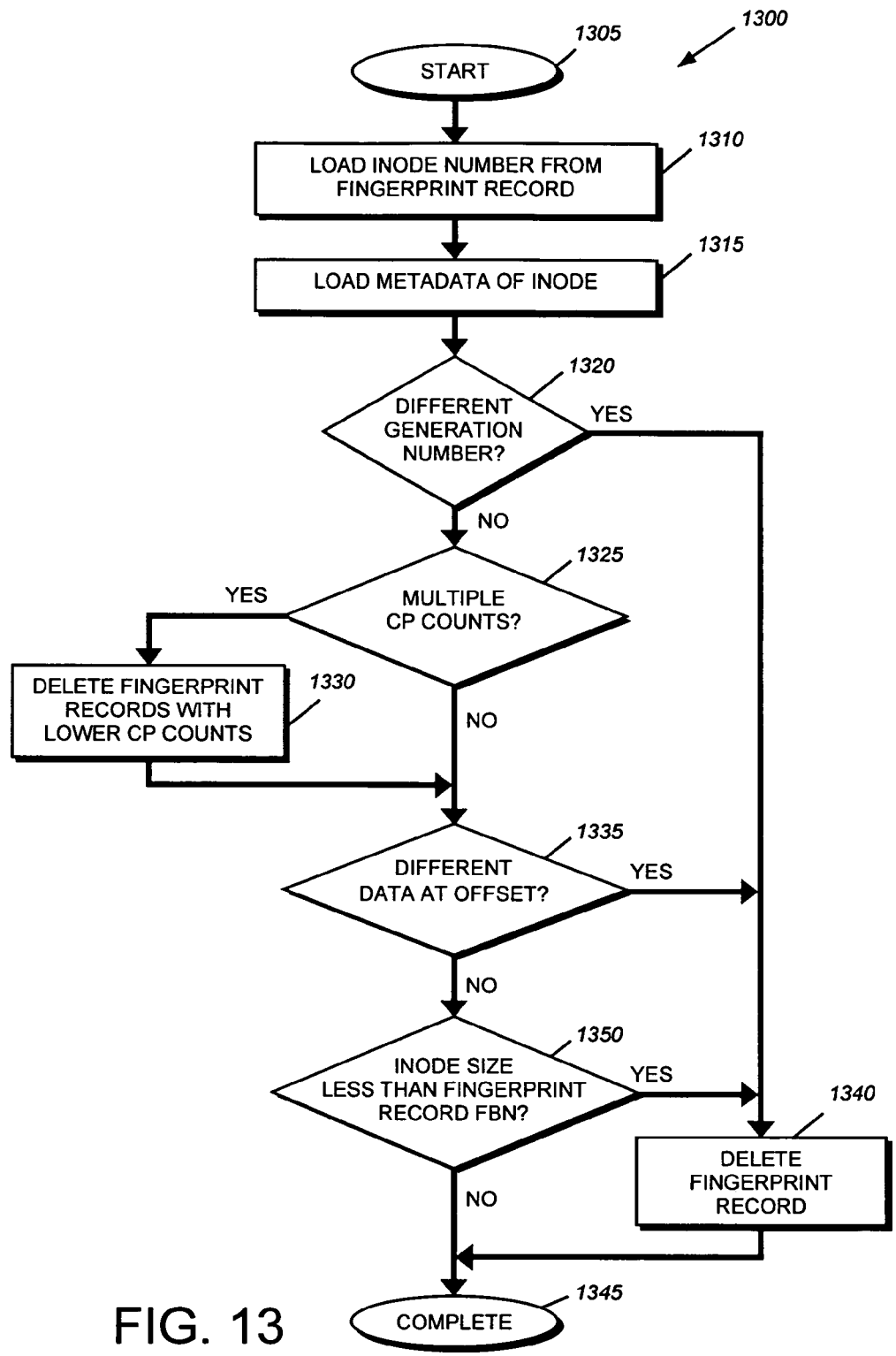
FIG. 13 is a flowchart detailing the steps of a procedure for deleting a stale fingerprint record in accordance with an embodiment of the present invention.

FIG. 13 is a flowchart detailing the steps of a procedure 1300 for deleting a stale fingerprint record in accordance with an embodiment of the present invention. Illustratively, the procedure 1300 is executed by the deduplication module 284, although it may also be executed by any other module capable of interfacing with the storage operating system 200. The procedure 1300 begins at step 1305 and continues to step 1310, where the deduplication module 284 reads (loads) the inode number 905 stored in the fingerprint record 900. The deduplication module 284 then uses the inode number 905 to load the inode 300 of the data block 406. To facilitate sequential disk access while loading the inodes of multiple fingerprint records, the fingerprint database 288 may be sorted according to inode number 905 and fbn 910 prior to or during the procedure 1300. At step 1315, the deduplication module 284 retrieves (loads) metadata from the inode 300 for verification against the metadata stored in the fingerprint record 900.

For example, at step 1320, the generation numbers 324, 915 are compared to determine whether the inode 300 has been deleted and reused (i.e., is different) since the fingerprint record 900 was created. If so, the fingerprint record 900 is stale, and the procedure 1300 continues to step 1340 where the fingerprint record 900 may be deleted. If not, the procedure 1300 continues to step 1325 where the CP counts 322, 920 are compared to determine whether the inode 300 has been modified (resulting in multiple CP counts) since the fingerprint record 900 was created. If so, the fingerprint record 900 is stale, and other fingerprint records corresponding to this inode 300 may likewise be stale if the inode 300 has been modified multiple times. Therefore, at step 1330, only the most recent fingerprint record 900 for this inode 300 is retained, and all others (with lower CP counts) may be deleted. To facilitate comparison between CP counts of multiple fingerprint records, the fingerprint database 288 may be sorted first by inode number 905 and second by CP count 920 (for fingerprint records sharing identical inode numbers).

Additionally, a data container may become truncated (e.g., by deleting all data after a given offset in a data container). Truncation of a data container might not affect the metadata stored in an associated inode 300. Therefore, at step 1335, the procedure 1300 utilizes the sample data 810 of the fingerprint 800 to verify consistency with the data block 406 (i.e., whether the data differs at a queue offset). In response to the sample data 810 (originally copied from one or more given offsets within the data block 406) differing from the data currently stored at the given offsets in the data block 406, the procedure 1300 continues to step 1340, where the fingerprint record 900 may be deleted. A data container may also be truncated at a preceding data block (e.g., by reducing a value stored in a size field of the inode 300 associated with the data container). Therefore, at step 1350, the procedure 1300 compares the fbn 910 of the fingerprint record 900 to the size 314 of the associated inode 300. In response to the size 314 being less than the fbn 910, the procedure 1300 continues to step 1340, where the fingerprint record 900 may be deleted. The procedure 1300 then completes at step 1345.

Illustratively, the stale fingerprint elimination procedure 1300 occurs periodically and/or in response to a predetermined condition (e.g., an administrator command being received from the UI 275). The procedure 1300 also may be triggered when the fingerprint database 288 exceeds a predefined threshold size. For example, as data blocks are repeatedly written and/or modified, the number of fingerprint records in the fingerprint database 288 may exceed a maximum number of data blocks in the storage system, because many of the fingerprint records have become stale. Illustratively, in response to the number of fingerprint records exceeding 120% of the maximum number of data blocks, the procedure 1300 may be triggered.

According to an alternate embodiment, the stale fingerprint elimination procedure 1300 may be implemented as part of the duplicate fingerprint identification and data deduplication procedure 1100. For example, procedure 1300 may be executed by the deduplication module 284 immediately before step 1110 of procedure 1100. This would reduce the amount of storage system processing resources wasted comparing stale fingerprints and any data blocks associated therewith.

The foregoing description has been directed to specific embodiments of this invention. It will be apparent, however, that other variations and modifications may be made to the described embodiments, with the attainment of some or all of their advantages. It is expressly contemplated that the procedures, processes, and methods described herein may be implemented in alternative orders. For example, the fingerprint queue to fingerprint database comparison step 1120 of procedure 1100 may follow or occur simultaneously with the fingerprint queue to fingerprint queue comparison step 1110. Likewise, the processes/procedures of fingerprint generation, duplicate identification, and stale fingerprint elimination may occur simultaneously, independently (i.e., in any order), or as a predefined sequence of processes/procedures. Furthermore, the teachings of this invention can be implemented as software (including a computer-readable medium having program instructions executing on a computer), hardware, firmware, or a combination thereof. While this description has been written in terms of a file system, the present invention also may be utilized with non-file system storage, such as luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    storing data in a plurality of data blocks serviced by a storage system having a processor;
    receiving a write operation directed to a data block of the plurality of data blocks;
    performing a first computation to generate a checksum value for the data block to verify data integrity of the write operation;
    generating, without requiring a second computation, a fingerprint of the data block to identify duplicate data of the plurality of data blocks by storing at least a portion of the checksum value generated to verify data integrity in the fingerprint and storing at least a portion of data from the data block in the fingerprint;
    storing, in a fingerprint record, a copy of extracted metadata associated with the data block, wherein the metadata includes a generation number of an index node (inode) associated with the data block;
    storing the fingerprint in the fingerprint record;
    deleting the inode associated with the data block;
    reallocating the inode in response to a new write operation;
    modifying the generation number of the inode associated with the data block in response to the new write operation; and
    eliminating the fingerprint record in response to the generation number of the fingerprint record differing from the modified generation number.

2. The method of claim 1, wherein storing at least the portion of data in the fingerprint comprises:
    sampling the data from a predefined offset within the plurality of data blocks; and
    storing the sampled data in a field of the fingerprint.

3. The method of claim 2, further comprising:
    modifying the data stored in the data blocks; and
    eliminating the fingerprint in response to the sampled data differing from the modified data.

4. The method of claim 1, wherein the metadata comprises a consistency point (CP) count copied to the fingerprint record as a CP count copy, the method further comprising:
    modifying the CP count in response to the new write operation; and
    eliminating the fingerprint record in response to the CP count copy of the fingerprint record differing from the modified CP count.

5. The method of claim 1, wherein the metadata comprises a size value associated with a number of data blocks, including the data block, within a data container, and further comprises a file block number (fbn) copied to the fingerprint record as a fbn copy, the method further comprising:
    modifying the size value in response to a change in the number of data blocks within the data container; and
    eliminating the fingerprint record in response to the fbn copy indicating an offset greater than the number of data blocks associated with the modified size value.

6. The method of claim 1, wherein the storage system comprises a fingerprint database configured to store a plurality of fingerprints associated with the plurality of data blocks, further comprising:
    comparing the fingerprint to a second fingerprint stored in the fingerprint database to identify the duplicate data.

7. The method of claim 1, further comprising:
    adding the fingerprint to a fingerprint queue.

8. The method of claim 7, further comprising:
    sorting the fingerprint queue by a plurality of inode numbers, wherein the plurality of inode numbers indicate a plurality of inodes associated with the plurality of data blocks.

9. The method of claim 1, wherein the storage system further comprises a storage module configured to implement a storage protocol, and wherein performing the first computation comprises:
    performing the first computation according to the storage protocol.

10. The method of claim 9, wherein the storage protocol comprises a Redundant Array of Inexpensive Disks (RAID) protocol.

11. The method of claim 1, further comprising:
    returning a message to a second module of the storage system, the message including the checksum value; and
    extracting the checksum value from the message to store at least the portion of the checksum value in the fingerprint.

12. The method of claim 1, further comprising:
    eliminating the fingerprint in response to the fingerprint being associated with a duplicate data block.

13. The method of claim 1, further comprising:
    eliminating one of a plurality of fingerprints in response to the plurality of fingerprints being associated with a predetermined number of data blocks of the plurality of data blocks.

14. The method of claim 1, further comprising:
    identifying that the fingerprint is stale; and
    eliminating the fingerprint in response to identifying that the fingerprint is stale.

15. A computer configured to identify duplicate data, comprising:
    a processor operatively connected to the computer configured to execute a storage operating system to issue a write operation directed to data of a storage device operatively connected to the computer;
    a first module of the storage operating system configured to process the write operation;
    the first module configured to perform a first computation to generate a checksum value for the data to verify data integrity of the write operation;
    the first module further configured to complete the write operation;
    a second module of the storage operating system configured to generate a fingerprint of the data to identify duplicate data, the fingerprint comprising at least a portion of the checksum value generated to verify data integrity and at least a portion of the data;

wherein the storage operating system is further configured to extract metadata associated with the data, wherein the second module is further configured to store the checksum value and a copy of the metadata as to a fingerprint record; and wherein the second module is further configured to store an index node (inode) number and a file block number (fbn) in the fingerprint record, wherein the inode number identifies an inode associated with the data and the fbn indicates an offset within a data container, and wherein the metadata comprises:

a generation number configured to indicate reallocation of the data, and a consistency point (CP) count configured to indicate modification of the data.

16. The system of claim 15, wherein the second module is further configured to store in a fingerprint database, a sampling of the data from a predetermined offset, and further configured to associate the sampled data with the checksum value.

17. The system of claim 15, wherein the second module is further configured to store the checksum value in response to the data being associated with a subset of data.

18. The system of claim 17, wherein the subset comprises data associated with the data container of a predetermined type.

19. The system of claim 15, wherein the first module is further configured to store the checksum value in a confirmation message, and wherein the second module is further configured to receive the confirmation message, extract the checksum value from the confirmation message, and use the extracted checksum value as at least the portion of the checksum value.

20. The system of claim 15, wherein the storage operating system is further configured to service a fingerprint queue that is configured to store the checksum value in response to the write operation, the storage operating system including a deduplication module configured to identify the duplicate data by identifying an identical checksum value among the fingerprint queue and a fingerprint database, the fingerprint database comprising a plurality of checksum values.

21. The system of claim 15, wherein the checksum value is calculated according to a Redundant Array of Independent Disk (RAIDS) protocol.

22. A non-transitory computer readable storage medium containing program instructions for execution by a processor, comprising:

program instructions that store data in a plurality of data blocks;

program instructions that receive a write operation directed to a data block of the plurality of data blocks;

program instructions that perform a first computation to generate a checksum value for the data block to verify data integrity of the write operation;

program instructions that generate a fingerprint of the data block by storing at least a portion of the checksum value generated to verity data integrity in the fingerprint;

program instructions that store a copy of extracted metadata associated with the data block in a fingerprint record, wherein the metadata includes a generation number of an index node (inode) associated with the data block;

program instructions that store the fingerprint in the fingerprint record;

program instructions that delete the inode associated with the data block;

program instructions that reallocate the inode in response to a new write operation;

program instructions that modify the generation number of the inode associated with the data block in response to the new write operation; and program instructions that eliminate the fingerprint record in response to the generation number in the fingerprint record differing from the modified generation number.

* * * * *

UNITED STATES PATENT AND TRADEMARK OFFICE
CERTIFICATE OF CORRECTION

| | | Page 1 of 1 |
|---|---|---|
| PATENT NO. | : 8,412,682 B2 | |
| APPLICATION NO. | : 11/477886 | |
| DATED | : April 2, 2013 | |
| INVENTOR(S) | : Ling Zheng | |

It is certified that error appears in the above-identified patent and that said Letters Patent is hereby corrected as shown below:

In the Specification

In col. 3, line 67 should read:
Additionally, ~~modem~~ modern storage systems, such as the NetApp®

In col. 10, line 5 should read:
System implemented as a ~~microkemel~~ microkernel and including the file In col. 15, line 35 should read:
Ods of low system activity, e.g., late at night or on ~~is~~

In the Claims

In col. 19, line 60 should read:
Modifying the data stored in the data blocks; and In col. 21, line 7 should read:
Sum value and a copy of the metadata ~~as~~ to a fingerprint In col. 22, line 8 should read:
Disk (RAID~~S~~) protocol Signed and Sealed this
Fourth Day of June, 2013

Teresa Stanek Rea
*Acting Director of the United States Patent and Trademark Office*